May 30, 1950     L. B. BORST     2,509,669
MECHANICAL COUPLING
Filed March 19, 1945

INVENTOR.
Lyle B. Borst
BY
Robert A. Lavender

Patented May 30, 1950

2,509,669

UNITED STATES PATENT OFFICE 2,509,669

MECHANICAL COUPLING

Lyle B. Borst, Oak Ridge, Tenn., assignor to the United States of America as represented by the United States Atomic Energy Commission Application March 19, 1945, Serial No. 583,498

3 Claims. (Cl. 287—63)

This invention relates to joints or coupling means for detachably securing together two abutting members and more particularly to a coupling arrangement in which an annular member encompasses a portion of each of the two members to be joined.

The invention finds particular usefulness in assembling a stringer to be used in exposing samples to radiations in a neutron reacting pile employing graphite as moderator material in which case blocks of graphite used to form the stringer must be joined together without using any material other than graphite. Heretofore, such joining has been accomplished by some form of dovetail joint which has the drawback of ruining a full length of graphite block whenever a joint breaks.

It is an object of the present invention to provide a coupling arrangement simple in structure, and which is easily assembled and disassembled by hand without the aid of tools.

Figure 1:
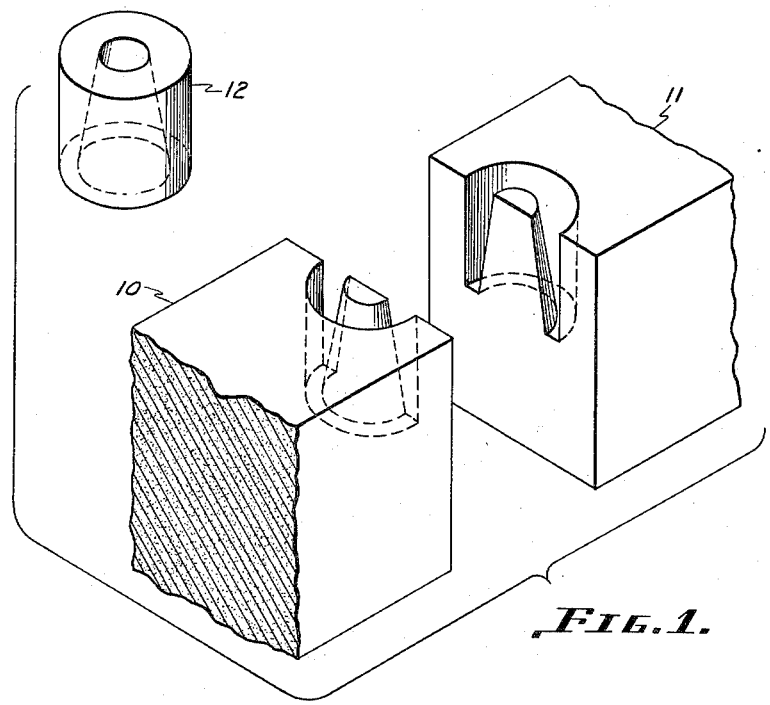
Figure 2:
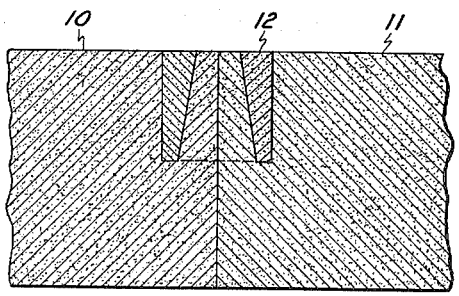

Other objects and advantages of the invention will be evident from the following description when read in connection with the accompanying drawing in which Figure 1 is an exploded view in perspective showing the essential elements of the preferred embodiment of the invention and Figure 2 is a cross sectional view of an assembled coupling.

As shown in the drawing, two members 10 and 11 which are to be joined in abutting relation have formed in their abutting ends complementary portions of an annular groove in which an annular coupling member 12 is adapted to seat. It is preferred to form the groove and the ring 12 with a cylindrical outer wall and a frustoconical inner wall. This shape makes it easier to insert and remove the ring 12 and also tends to bring the abutting faces into more intimate contact as the ring 12 is pressed home. It is also preferred to proportion the parts such that failure under tension will occur at the ring 12 which will be easy to replace without sacrificing either of the blocks 10 and 11. This feature is important when the material is high quality graphite as mentioned above.

The angle of taper for the frusto-conical surfaces is not at all critical, the main requirement being that the taper is sufficient to permit removal without binding but not great enough to forfeit its primary function of holding the blocks 10 and 11 in abutting relation. Tapers of between 5 and 15 degrees have been found to be satisfactory.

As indicated above, the particular use for which the present arrangement was devised is to couple together a series of graphite blocks to form a stringer. These stringers in practice have been about twenty-four feet long and were constructed by coupling together a series of graphite blocks each about three feet long and four inches square.

It will be obvious from the above description that variations from the structure shown may be made without departing from the invention, the scope of which is pointed out in the appended claims.

I claim:

1. A joint comprising two members in abutting relation and having semi-circular grooves formed in the abutting ends to provide an annular groove having a cylindrical outer wall and a frustoconical inner wall, and an annular coupling member seated in and fitting the annular groove.

2. A coupled block assembly comprising two abutting-graphite blocks each formed with complementary portions of an annular groove defining complementary portions of a frustum of a cone, and an annular graphite ring nesting in said groove.

3. A coupled block assembly as claimed in claim 2 in which the frusto-conical portions are so proportioned with respect to the annular ring that under increasing tension said ring will fail first.

LYLE B. BORST.

REFERENCES CITED

The following references are of record in the file of this patent:

UNITED STATES PATENTS

| Number | Name | Date |
|---|---|---|
| 563,529 | Wilson | July 7, 1896 |
| 687,798 | Rhynedance | Dec. 3, 1901 |
| 1,069,538 | Evans | Aug. 5, 1913 |
| 1,098,018 | Cook | May 26, 1914 |
| 2,142,896 | Harman | Jan. 3, 1939 |
| 2,377,156 | Kimbell | May 29, 1945 |